United States Patent
Zhou et al.

(10) Patent No.: US 6,317,695 B1
(45) Date of Patent: Nov. 13, 2001

(54) SEISMIC DATA PROCESSING METHOD

(75) Inventors: Zheng-Zheng Zhou, Houston; Jaime A. Stein; Michael S. Keehan, both of Sugar Land, all of TX (US)

(73) Assignee: NuTec Sciences, Inc., Stafford, TX (US)

( * ) Notice: Subject to any disclaimer, the term of this patent is extended or adjusted under 35 U.S.C. 154(b) by 0 days.

(21) Appl. No.: 09/539,143

(22) Filed: Mar. 30, 2000

(51) Int. Cl.$^7$ .................................................. G01V 1/28
(52) U.S. Cl. ................................................. 702/17; 702/16
(58) Field of Search ............................... 702/14, 17, 18, 702/16; 367/73, 53, 45

(56) References Cited

U.S. PATENT DOCUMENTS

| | | | |
|---|---|---|---|
| 4,964,103 | 10/1990 | Johnson | 367/53 |
| 5,321,612 | 6/1994 | Stewart | 364/420 |
| 5,349,527 | 9/1994 | Pieprzak et al. | 364/421 |
| 5,392,255 | 2/1995 | LeBras et al. | 367/50 |
| 5,404,296 | 4/1995 | Moorhead | 364/421 |
| 5,530,646 | 6/1996 | Schoen | 364/421 |
| 5,537,319 | 7/1996 | Schoen | 364/421 |
| 5,717,943 | 2/1998 | Barker et al. | 395/800 |
| 5,734,829 | 3/1998 | Robinson | 395/200.35 |
| 5,781,775 | 7/1998 | Ueno | 395/672 |
| 5,787,301 | 7/1998 | Arakawa et al. | 395/800.2 |
| 5,822,608 | 10/1998 | Dieffenderfer et al. | 395/800.2 |
| 6,021,094 | 2/2000 | Ober et al. | 367/53 |
| 6,026,058 | 2/2000 | Thomas | 367/56 |
| 6,081,482 | * 6/2000 | Bevc | 367/57 |

OTHER PUBLICATIONS

Clayton, R.W., et al., "Absorbing boundary conditions for wave–equation migration," 45(5) Geophysics 895–904. ( May 1980).

Gazdag, J., et al., "Migration of seismic data by phase shift plus interpolation," 49(2) Geophysics 124–131. (Feb. 1984).

Ober, Curtis, et al., "Salvo Seismic Imaging Software for Complex Geologies," Sandia National Laboratories Report No. SAND2000–0300, Feb. 2000.

Li, Zhiming, "Compensating finite–difference errors in 3–D migration and modeling, " 56(10) Geophysics 1650–1660. (Oct. 1991).

Graves, R.W., et al., "Modeling Acoustic Waves with Paraxial Extrapolators," 55(3) Geophysics 306–319. (Mar. 1990).

* cited by examiner

Primary Examiner—Donald E. McElheny, Jr.
(74) Attorney, Agent, or Firm—Baker Botts L.L.P.

(57) ABSTRACT

A method for migrating seismic data is disclosed in which seismic traces recorded by a plurality of receivers are separated into offset bands according to the offsets of the traces. The data in each offset band is then migrated according to a downward continuation method. The downward continuation method includes the calculation of a constant that is not dependent on the value of the wave field. The constant is used to calculated the wave field for all offset bands for a given z level, thereby reducing time and computation resources consumed by the migration of the offset bands. Following the downward continuation, an imaging condition may be applied to produce a seismic image.

19 Claims, 5 Drawing Sheets

(3 of 5 Drawing Sheet(s) Filed in Color)

SEISMIC DATA PROCESSING METHOD

BACKGROUND OF THE INVENTION

It is well known that the Earth's subsurface can be imaged by a seismic survey. In a seismic survey, elastic waves generated at the surface of the Earth are injected into the Earth's subsurface by means of an explosive source such as a dynamite charge, in the case of a land-based survey, or an air gun, in the case of a marine survey. As the waves travel through the Earth, subsurface changes in the geological composition of the Earth cause the waves to reflect and propagate toward the surface. When the reflected waves reach the surface, they are recorded by a number of receivers. The receivers may be positioned at locations on the Earth's surface or towed behind seismic boats in the form of a very long cable made up of hydrophones. The data recorded by the receivers is processed to produce an image of the geological subsurface of the earth.

The data recorded by each receiver is a time series representing reflections from the subsurface caused by the explosive source at the surface of the Earth. This time series is known as a trace. The behavior of these traces is governed by the wave equation. It is known that by using the redundancy that is built into the method of data acquisition, the wave equation can be used to predict the speed at which the sound waves propagate through the Earth's surface. The wave equation predicts the dissipation of energy as a function of the known velocities of geological formations in the x, y, and z directions as the waves propagate through the Earth. After a large amount of data, in the form of seismic traces, is collected, it is processed. Following processing of the traces to eliminate noise, a stacking process may be performed in which traces are summed together into a three dimensional array of numbers comprising the amplitudes of reflected seismic waves recorded over a period of time. Following the noise elimination step, the stacked data can be migrated.

Data migration is the reconstruction of an image or map of the Earth's subsurface from the seismic data in the time domain as recorded by the seismic receivers at the Earth's surface. Data migration converts the data from the time domain to space or image-point domain. The data that exists in the time domain is mispositioned both laterally and vertically. Migration converts these mispositioned data to ones representing lateral and depth positions of geological structures. An example of seismic record migration is described in U.S. Pat. No. 6,021,094 to Ober et al, which is incorporated herein by reference. Although the step of data migration is often performed on post-stack data, migrating post-stack data can result in an imprecise or incorrect result. Simple stacking of traces can depict complex subsurface features in an incorrect location, or simple stacking of traces may have the effect of negating a subsurface feature in the stacked data. Because of the imprecision of migrated stacked data, pre-stack migration of the seismic records is preferred. The migration of pre-stack seismic records, however, involves a greater amount of time and computational resources, as compared to the migration of stacked seismic records.

The extra computation and time required for the pre-stack processing of data is well justified. The migration of pre-stack data results in the generation of migrated or image gathers. These image gathers are the fundamental diagnostics tools that are used to determine the correctness of the velocity model. The image gathers also provide the starting point for any velocity-updating scheme. The accuracy of a generated velocity model is dependent on the accuracy of the image gathers generated by the migration of pre-stack data. The difficulty of velocity-updating, whether accomplished by vertical or tomographic methods, resides in the fact that the ambiguity in the pre-stack data stems from the simultaneous arrivals of signals from a point in the Earth's subsurface to a given point on the Earth's surface. Wave equation migrations make this concern a moot point in that wave equation migrations are capable of collapsing the simultaneous arrival of signals into well-defined horizontal events in the migrated gathers, which in turn makes the velocity-updating procedure a more deterministic and robust one, capable of providing a more accurate and realistic answer. Moreover, amplitude versus offset (AVO) analysis also relies on migrated gathers, which depict geological events at a set of different offsets. The manner in which the amplitude of any particular subsurface events varies with offset depends on the property of the subsurface geology of the event. Such information aids geologists in better understanding the subsurface geologies in general and the location of hydrocarbon deposits in particular.

A number of algorithms have been used to perform the migration step. All are based to some extent on an approximation, simplification, or variation of the wave equation. Because of a lack of time and computational resource, the full wave equation, or the full solution to the depth imaging problem, has not been employed effectively to migrate pre-stack data. Employing the full wave equation would require both time and computational resources beyond what is now available or commercially feasible.

SUMMARY OF THE INVENTION

In accordance with the present invention, a method for migrating pre-stack seismic data to generate image gathers is provided that substantially eliminates or reduces disadvantages or problems associated with prior methods for migrating seismic data.

The method for migrating seismic data of the present invention involves the grouping of recorded seismic traces into offset bands according to the offsets of the traces. The traces of each offset band are migrated as a group. Each offset band is migrated using a downward continuation. The downward continuation calculates the wave field at each x-y grid at each z level on the basis of the preceding wave field. As part of the downward continuation, constants are generated from values that are the same for each level across all offset bands.

An advantage of the present invention is that the method for migrating seismic data described herein provides significant savings in computational time and resources as compared to prior wave equation based methods of migrating seismic data to generate image gathers. The grouping of recorded traces into offset bands and the recognition that the downward continuation could be streamlined reduces the computational resources required to generate image gathers. The image gathers can be generated with fewer computational resources as compared with known migration techniques.

Another advantage of the present invention is that it provides a method for evaluating the correctness of the velocity model. The present invention may be used to generate image gathers that accurately depict geological events. The accuracy or quality of the geological events depicted in the image gathers can then be evaluated to determine whether the velocity model is correct or is in need of updating.

Other technical advantages of the present invention will be readily apparent to one skilled in the art from the following figures, descriptions, and claims.

BRIEF DESCRIPTION OF THE DRAWINGS

The file of this patent contains at least one drawing executed in color. Copies of this patent with color drawing (s) will be provided by the Patent and Trademark Office upon request and payment of the necessary fee.

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The present invention concerns a method of seismic data processing, and more specifically, a method for generating from the wave equation pre-stack depth migration image gathers that are in the CDP-offset domain and a method for achieving high computational efficiencies during the migration of the pre-stack traces.

In the seismic data processing method of the present invention, a series of shots or vibrations are injected into the Earth's subsurface. The waves generated by these shots are reflected back to the Earth's surface, where they are recorded by receivers, which are typically geophones or hydrophones or other measuring devices positioned at or close to the Earth's surface. A typical seismic exploration project for a given area may involve many thousands of shots. Each one of the shots may generate over one thousand traces, a trace being defined as the data recorded by a single receiver from a single shot. Given the large number of shots and receivers involved in a typical project, a massive amount of data may be collected.

The present invention concerns the generation of migrated pre-stack gathers, from the traces generated by the shots. The data recorded by the geophones can be migrated from the time domain to the common-depth point or image domain to produce an image of the Earth's subsurface. If the velocity model used for migration is incorrect, then the image of the geological events will be distorted, resulting in migrated gathers that display, among other incorrect features, incoherent noise or incorrectly positioned non-flat or dipping events. An image gather that includes non-horizontal or dipping events is used as a quality control indicators that the velocity model used in the wave equation during the migration of the data was incorrect. More importantly, it can also be used to update the velocity model to produce a more precise model. This new model is then used to migrate the data again. This cycle is repeated until accurate migrated gathers have been generated.

Figure 1:
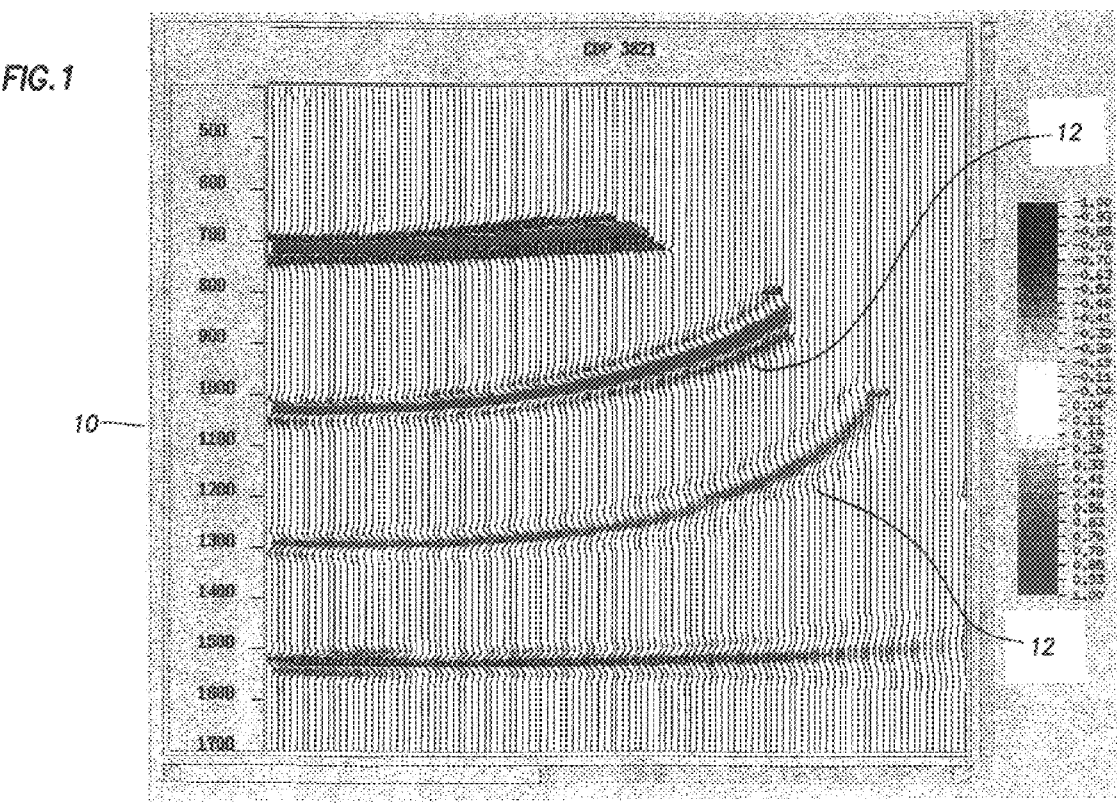
FIG. 1 is a seismic image gather that includes a mis-migrated, dipping event.
Figure 2:
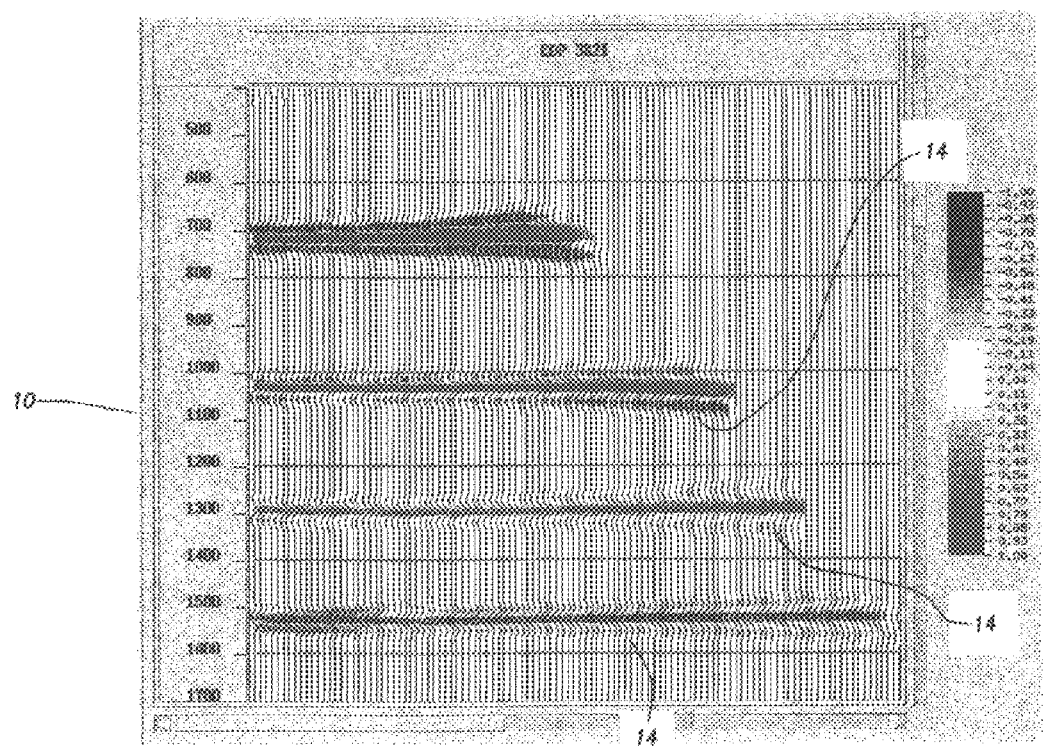
FIG. 2 is a seismic image gather that includes a substantially horizontal event.

Pre-stack traces may be migrated iteratively on the basis of successive velocity models until it is determined that the velocity model used in the wave equation of the migration step is correct. The correctness of the velocity model is evaluated after each migration by the presence or absence of non-horizontal or dipping events in the resulting image gathers. FIG. 1 is an example of a seismic image 10 that includes dipping events 12. By iteratively migrating the pre-stack data, the migration step can be performed until a correct velocity model is determined, resulting in seismic image gathers that include substantially horizontal subsurface events. An example of such a velocity model is shown in FIG. 2 in which the seismic image 10 of FIG. 1 includes a subsurface geological events 14 that are substantially horizontal. Substantially horizontal events in the image gathers indicate that the velocity model used for the data migration step is correct. Once the correct velocity model has been determined, the recorded data can be migrated to produce a final high-resolution image. The preferred imaging condition is:

$$I(\vec{r}) = \sum_{k,\omega} \Re[d_k^*(\omega, \vec{r}) \cdot u_k(\omega, \vec{r})] \qquad \text{Equation 1}$$

or, when illumination compensation is desired, $$I(\vec{r}) = \frac{\sum_{k,\omega} \Re[d_k^*(\omega, \vec{r}) \cdot u_k(\omega, \vec{r})]}{\sum_{k,\omega} d_k^*(\omega, \vec{r}) \cdot d_k(\omega, \vec{r})} \qquad \text{Equation 2}$$

In Equations 1 and 2, the value k is the shot index, and the value $\Re$ is the real part of the terms in square brackets. The value u is the up going wave reconstructed by downward extrapolating the wave as measured by geophones at the Earth's surface; this operation is known as downward continuation. The value d is the down going wave as reconstructed by performing a downward continuation on the known or estimated wave source at the Earth's surface. The value r stands for the position value (x, y, z).

The seismic imaging method of the present invention involves the grouping of the traces generated by each shot into multiple offset bands. The traces produced by each shot may be separated into bands numbering between twenty and forty, for example. Rather than migrating each trace individually as a method for generating migrated gathers, the traces in each of the offset bands are migrated as a group. The bands are selected on the basis of offset bins; i.e. all the traces that fall into an offset bin are grouped into a band. The migrated data generated from one offset band is assigned an offset that is equal to the midpoint of the offset bin defining the offset band. Grouping and migrating traces in this manner reduces the time and computational resources required for migration. Following the migration of the data, an image condition can be applied to the data to produce an image of the subsurface formation. The number of offset bands should be selected so that the resulting image is of sufficient resolution to depict visually the subsurface formation. As an example, as few as ten offset bands may be sufficient for an adequate visual depiction of the subsurface formation.

Figure 3:
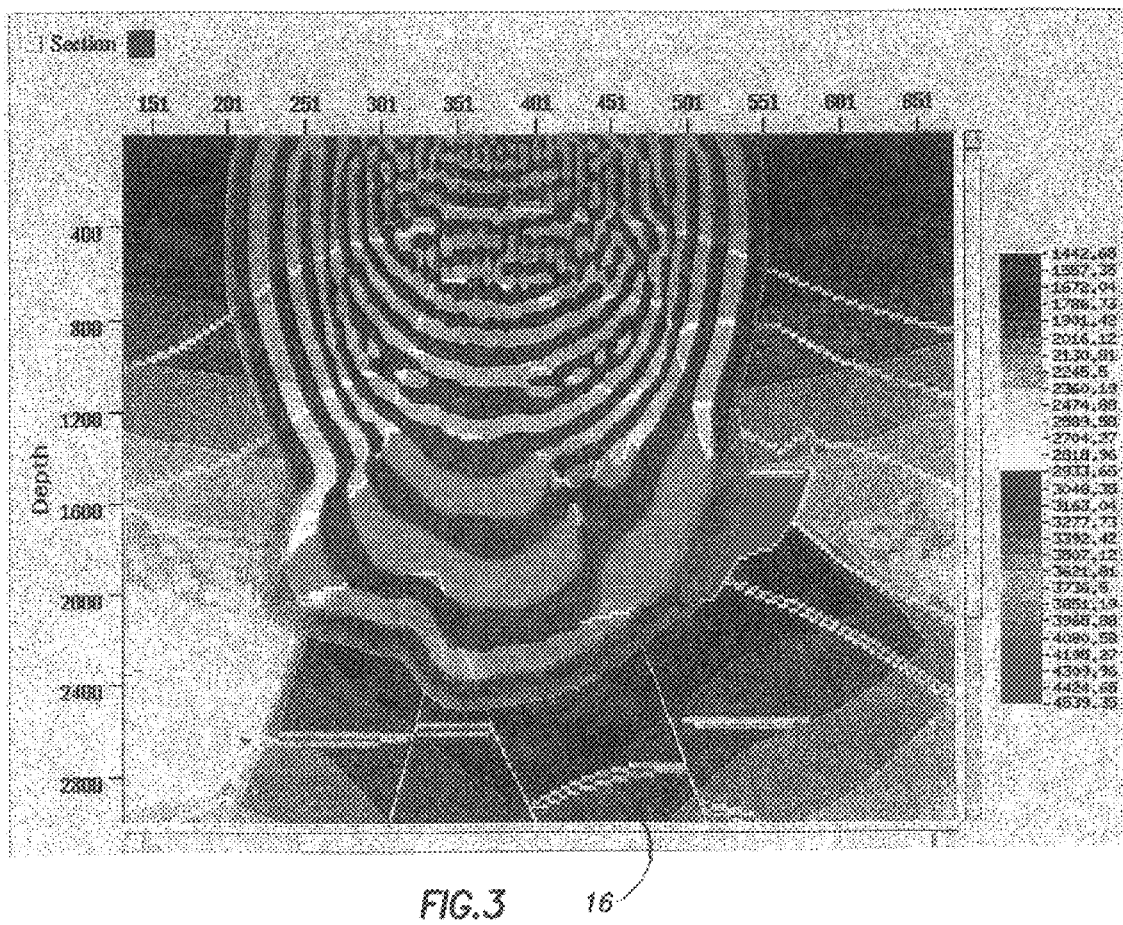
FIG. 3 is an image of seismic waves propagating through the earth superimposed on a diagram of a geological formation.

Shown in FIG. 3 is a snapshot 16 of seismic waves propagating through the earth. Superimposed in FIG. 3 is a geological formation. As part of a seismic survey, a shot source will direct a number of shots into the earth, where geological formations reflect the acoustic waves back toward the surface. The wave reflected back to the surface of the Earth is the up going wave. The up going wave is recorded by a number of receivers at the Earth's surface. The data recorded at the Earth's surface is said to be the wave field at zero depth. The number of receivers located at the Earth's surface as part of a seismic survey may number in the tens or hundreds. In the seismic imaging method of the present invention, the traces of the up going wave recorded by each of the receivers are grouped into offset bands according to their shot-to-receiver offset. Assuming that the desired migrated gathers full offsets are represented by $h_i$, where i=1, 2, ... n, the value n being the number of desired windows or offset bands. The value $h_i$ represents the distance between the receiver and the shot. The corresponding windowing functions for each of the groups or offset ranges are:

$$W_i(x, y) = \begin{cases} 1, & (h_i + h_{i+1})/2 > \sqrt{x^2 + y^2} \geq (h_i + h_{i-1})/2 \\ 0, & \text{otherwise} \end{cases} \quad \text{Equation 3}$$

For shot k, the initial field as measured at the surface of the up going wave field for offset band i is $u_{k,i}(t, x, y, 0) = W_i(x-x_k, y-y_k)Au_k(t, x, y, 0)$, where $u_k(t, x, y, 0)$ is the recorded seismic data at the geophones, the value of z being 0. The values $x_k$ and $y_k$ are the physical locations of the shot coordinates.

After performing a Fourier transformation along the t axis on the initial representation of the up going wave equation, a downward continuation extrapolator, described more fully below, can be applied to the up going wave for the particular offset range for every z plane to be evaluated. Once the wave fields have been reconstructed along their depth according to the downward continuation method described below, an imaging condition is applied, yielding the reflectivity of the subsurface. The migrated image for each of the offset range is shown as:

$$I(\vec{r}, h_i) = \sum_{k,\omega} R[d_k^*(\omega, \vec{r}) \cdot u_{k,i}(\omega, \vec{r})] \quad \text{or} \quad \text{Equation 4}$$

$$I(\vec{r}, h_i) = \frac{\sum_{k,\omega} R[d_k^*(\omega, \vec{r}) \cdot u_{k,i}(\omega, \vec{r})]}{\sum_{k,\omega} d_k^*(\omega, \vec{r}) \cdot d_k(\omega, \vec{r})} \quad \text{Equation 5}$$

Where image I is defined by the location vector r and the offset $h_i$. The value ω is the frequency of the wave. Here, the down going wave d does not depend on the offset $h_i$. Therefore, it is possible to construct d via downward continuation only once for all offset bands, gaining nearly a factor of two of savings in computational costs compared to constructing down going wave d separately for each offset band.

The technique of downward continuation is based on the fact that, in an acoustic medium, given a knowledge of the history of a wave's amplitude and its vertical spatial derivative at all points on a given plane, sometimes referred to as the recording plane, the acoustic wave equation can be used to determine the wave field in a plane a small distance above or below the recording plane. This process can be applied repeatedly to reconstruct the entire wave field within the volume of interest. Further, assuming that the wave under analysis propagates only in the up (z+) or down (z−) directions, the acoustic wave equation can be modified to a one-way wave equation, enabling the reconstruction process to be accomplished using only a knowledge of the wave amplitudes in the recording plane. This process is known as a downward continuation or extrapolation in which the wave field at each successive plane is determined from the data associated with the wave field in the plane immediately above it. An example of a downward continuation technique is shown in U.S. Pat. No. 5,392,255 to LeBras et al, which is incorporated herein by reference.

Using the downward continuation method of extrapolation, the wave field from the source must be extrapolated to determine the wave field from the source as it passes through the Earth. Similarly, the data recorded by the receivers at the surface must also be extrapolated into the Earth to reconstruct the wave field as it is reflected back to the surface. Because the wave field received at the surface will be broken into as many as twenty to forty separate bands, some elements of the downward continuation extrapolation of the wave field need not be repeated for each of the twenty to forty bands. These computations, once performed, may be shared between the downward continuation extrapolations of all of the separate bands.

Shown below in Equation 6 is the full acoustic or scalar wave equation.

$$\left[\frac{\partial^2}{\partial x^2} + \frac{\partial^2}{\partial y^2} + \frac{\partial^2}{\partial z^2}\right]P = \frac{1}{v^2}\frac{\partial^2}{\partial t^2}P \quad \text{Equation 6}$$

P is the wave field and is a function of (t, x, y, z). The variable v represents the acoustic velocity and is a function of (x, y, z). Because v is time invariant, a Fourier transform over t can be applied to both sides of the equation, replacing $$\frac{\partial^2}{\partial t^2}$$

with $-\omega^2$. By further applying the paraxial approximation, we get the one-way wave equation, which is shown as Equation 7 below:

$$\frac{\partial}{\partial z}P = \pm \frac{i\omega}{v}\sqrt{1 + \frac{v^2}{\omega^2}\left(\frac{\partial^2}{\partial x^2} + \frac{\partial^2}{\partial x^2}\right)}P \quad \text{Equation 7}$$

Because velocity v is known, P is now a function of (w, x, y, z) in Equation 7. The square root term of Equation 7 complicates the equation. This term can be approximated by applying a continued fraction expansion. Retaining the first term of the continued fraction expansion in both the x and y direction and dropping the cross-derivatives yields the following simplified and approximated equation.

$$\frac{\partial}{\partial z}P = \pm \frac{i\omega}{v}\left[1 + \frac{\alpha S_x}{1 + \beta S_x} + \frac{\alpha S_y}{1 + \beta S_y}\right]P \quad \text{Equation 8}$$

In Equation 3, $$S_u = \frac{v^2 \partial^2}{\omega^2 \partial u^2},$$

and u=x,y. The expansion coefficients are normally chosen to be α=0.478 and β=0.376.

To perform the downward continuation process, Equation 8 is then solved using the method of fractional steps to extrapolate the wave field $P^{k+1}$ at a depth equal to z=(k+1)Δz from the wave field $p^k$ at z=kΔz. The level k+1 represents the next depth level in the downward direction, and Δz is the distance between levels or planes. The solution to Equation 8 is obtained by first solving for the first term of the right side of Equation 8 to yield a first intermediate result, $A^{k+1}$. The first intermediate result is then used to solve for the second term of the right side of Equation 8, yielding a second intermediate result, $B^{k+1}$. The second intermediate result is then used with the last term of Equation 8 to yield a final result, $P^{k+1}$. The details of these steps are explained below.

The equation that contains only the first term of Equation 8 is shown below as Equation 9:

$$\frac{\partial}{\partial z}P = \pm \frac{i\omega}{v}P \qquad \text{Equation 9}$$

Equation 9 can be solved for $p^{k+1}$ to yield the result of Equation 10:

$$P^{k+1} = e^{\pm \frac{i w}{v}\Delta z}P^k \qquad \text{Equation 10}$$

In the resulting Equation 10, the variable $p^{k+1}$ is the value of the first intermediate result $A^{k+1}$, which can be rewritten in Equation 11 as:

$$A^{k+1} = e^{\pm \frac{iw}{v}\Delta z}P^k \qquad \text{Equation 11}$$

The equation containing only the second term of Equation 8 is shown below as Equation 12:

$$\frac{\partial}{\partial z}P = \pm \frac{i\omega}{v}\frac{\alpha S_x}{1+\beta S_x}P \qquad \text{Equation 12}$$

Equation 12 can be rewritten as Equation 13 by relocating the denominator from the right side of the equation:

$$(1+\beta S_x)\frac{\partial}{\partial z}P = \pm \alpha \frac{i\omega}{v}S_x P \qquad \text{Equation 13}$$

Equation 13 is then discretized in the z direction according to the Crank-Nicholson method, which sets up Equation 13 at mid step according to the formula $z=(k+\frac{1}{2})\Delta z$, yielding the result of Equation 14:

$$\frac{1}{\Delta z}(1+\beta S_x)(P^{k+1} - P^k) = \pm \frac{\alpha}{2}\frac{i\omega}{v}S_x(P^{k+1} + P^k) \qquad \text{Equation 14}$$

Equation 14 is the second step in the method of fractional steps. In Equation 14, $P^k$ is identified as the first intermediate result $A^{k+1}$, and $P^{k+1}$ is the second intermediate result $B^{k+1}$. Substituting the first and second intermediate results yields the following as Equation 15:

$$\frac{1}{\Delta z}(1+\beta S_x)(B^{k+1} - A^{k+1}) = \pm \frac{\alpha}{2}\frac{i\omega}{v}S_x(B^{k+1} + A^{k+1}) \qquad \text{Equation 15}$$

In order to discretize Equation 10 in the x direction, $S_x$ is replaced with the second-order compact finite difference operator shown below in Equation 16.

$$S_x \rightarrow \frac{v^2}{\omega^2}\frac{\delta_x^2}{1+\lambda \Delta x^2 \delta_x^2} \qquad \text{Equation 16}$$

The compact coefficient $\lambda$ is commonly chosen to be about $\frac{1}{6}$, but it can be made a function of $\omega$ for better accuracy. In addition, $$\delta_x^2 P = \frac{P_{i-1,j} - 2P_{i,j} + P_{i+1,j}}{\Delta x^2} \qquad \text{Equation 17}$$

In Equation 17, the value i is the x grid index value following the discretization in the x direction, and j is the y grid index. By these series of steps, the second order lateral x spatial derivative operators have been replaced in the approximation of the wave equation.

The values of Equations 16 and 17 are substituted into Equation 15. After separation and rearranging the equations, the following equations can be derived:

$$a_{i,j}B_{i-1,j}^{k+1} + (1-2a_{i,j})B_{i,j}^{k+1} + a_{i,j}B_{i+1,j}^{k+1} = b_{i,j} \qquad \text{Equation 18}$$

where $$a_{i,j} = \lambda + \frac{\beta v_{i,j}^2}{\Delta x^2 \omega^2} - \frac{\pm i\alpha \Delta z v_{i,j}}{2\Delta x^2 \omega} \qquad \text{Equation 19}$$

and $$b_{i,j} = a_{i,j}^* A_{i-1,j}^{k+1} + (1-2a_{i,j}^*)A_{i,j}^{k+1} + a_{i,j}^* A_{i+1,j}^{k+1} \qquad \text{Equation 20}$$

Because the value of $A^{k+1}$ is known, the terms of the combined equations are collected with a view toward separating constant terms and solving for $B^{k+1}$.

Various absorbing boundary conditions can be used at the two ends of the x grids. Examples of suitable boundary conditions are Clayton and Enquist's absorbing boundary conditions and Li Yang Xu's absorbing boundary condition. These boundary conditions are discretized in such a manner that the resulting linear equations contain only two terms, preserving the tri-diagonal structure of Equation 18. Thus, Equation 18 can be efficiently solved using the Thomas algorithm for the solution of tridiagonal matrices. The Thomas algorithm is described in U.S. Pat. No. 5,321,612 to Stewart, which is incorporated herein by reference. The Thomas algorithm involves a forward and a backward sweep through the grids in the x direction.

Equation 19 has been arranged so that none of the components of the equations are dependent on the present or previous values of the wave field P. Thus, $a_i$ is independent of the wave field in the downward continuation analysis. Rather, $a_i$ is determined from velocity, frequency, and other known values. The constant can be used in the first step, the forward sweep, in the Thomas algorithm, requiring that the forward sweep be performed only once for all offset bands. It has been determined that the calculation of the value $a_i$ and the associated forward sweep accounts for more than forty percent of the floating point computations necessary for the determination of $B^{k+1}$. The identification of a value that is not dependent on the status of the wave field decreases the computational time required for the processing of the wave field because the value $a_i$ is not calculated and the forward sweep is not performed for every offset band.

The above example demonstrates the computation of the wave field according to the downward continuation method in the x direction in the x-y grid. A similar set of steps is performed to compute the wave field in the y direction on the x-y grid. Following the series of steps outlined above, the value of the third term of the right side of Equation 8 is solved using the method of fractional steps and the known value of the first term of the right side of Equation 8. The result of these steps is the following $$a_{i,j}P^{k+1}_{i,j-1} + (1-2a_{i,j})P^{k+1}_{i,j} + a_{i,j}P^{k+1}_{i,j+1} = b_{i,j}$$ Equation 21 where $$a_{i,j} = \lambda + \frac{\beta v^2_{i,j}}{\Delta y^2 \omega^2} - \frac{\pm i\alpha \Delta z v_{i,j}}{2\Delta y^2 \omega}$$ Equation 22 and $$b_{i,j} = a^*_{i,j}B^{k+1}_{i,j-1} + (1-2a^*_{i,j})B^{k+1}_{i,j} + a^*_{i,j}B^{k+1}_{i,j+1}$$ Equation 23

The result of these equations is $P^{k+1}$, which represents the wave field in the next depth step in the y direction.

By following these series of steps, the wave equation is approximated in such a way that the up going wave field at each depth is related through several linear equations to the wave field at the depth level immediately above it. The linear system is solved iteratively from the surface downward for both the shot wave and each of the offset bands to reconstruct the full subsurface wave field. Other computational efficiencies can be achieved as well. As explained above, the input traces of each shot are grouped into offset bands according to the offset of the traces. Each offset group is migrated separately. Because the shot will be the same for each offset group, the shot or down going wave need be calculated according to the downward continuation method only once. Determining the shot wave or down going wave field only one time for each shot reduces the computational resources and time expanded by nearly a factor of 2.

It should also be recognized that the approximation of the wave field equation in Equations 8 through 23 introduces errors in the downward continuation result. If these errors are not accounted for on an iterative basis, they would accumulate. The approximation error can be corrected by the Li phase correction technique described in Li, Zhiming, "Compensating finite-differences errors in 3-D migration and modeling", Geophysics, Vol. 56, No. 10. The phase correction applied to each wave field at each iteration of the downward continuation method is only a function of subsurface velocity. For this reason, the Li filter correction, like the value $a_i$, need only be calculated once for all offset bands of a single shot, thereby reducing the computational resources consumed by the downward continuation method, while providing an error correction techniques that prevents the accumulation of errors following each downward continuation. Other phase correction filters can be used in place of or in combination with the Li filter. An example is the Graves and Clayton filter, which are described in Graves, R. W. and Clayton, R. W., "Modeling Acoustic Waves with Paraxial Extrapolators, Geophysics", Vol. 55, No. 3, March 1990, which is incorporated herein by reference. The Graves and Clayton filter corrects for the x-y splitting error only and not for error introduced by the truncation of the continued fraction expansion series of the square root operator. It should be recognized that an error correction step need not be applied following each downward continuation step. It may be sufficient to apply an error correction function following each fifth, tenth, fifteen, or some other multiple of steps, as appropriate.

Figure 4:
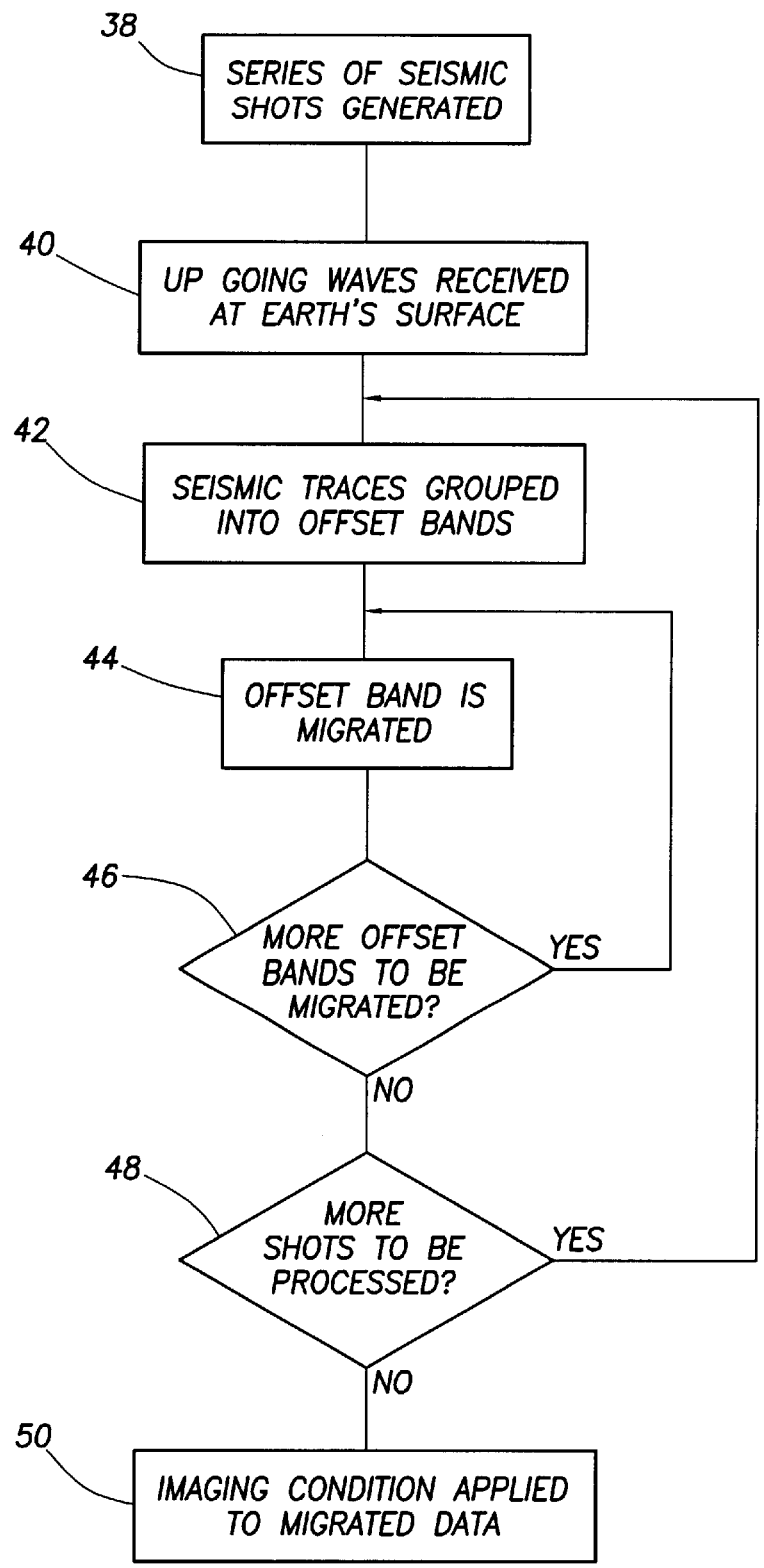
FIG. 4 is a flow diagram of the migration steps of the present invention.

FIG. 4 is a flow diagram of the migration steps of the present invention. Following a series of shots as part of a seismic survey at step 38, the up going acoustic waves generated by those shots are received at step 40 at a plurality of receivers located at the Earth's surface. Following the collection of seismic traces from the series of shots at step 40, the traces recorded at the geophones for each unique shot are then separated at step 42 into offset bands according to the offset of traces. At step 44, the first of the offset bands is migrated, using the downward continuation techniques disclosed of the present invention. If it is determined at step 46 that more offset bands remain to be migrated, process continues at step 44 with the migration of the next following offset band according to the downward continuation method described herein. At step 48, if more shots are available for processing, the method continues at step 42 with the separation of traces for the next following shot. Once all of the shots have been processed, an imaging condition is applied at step 50 to produce a seismic image.

Figure 5:
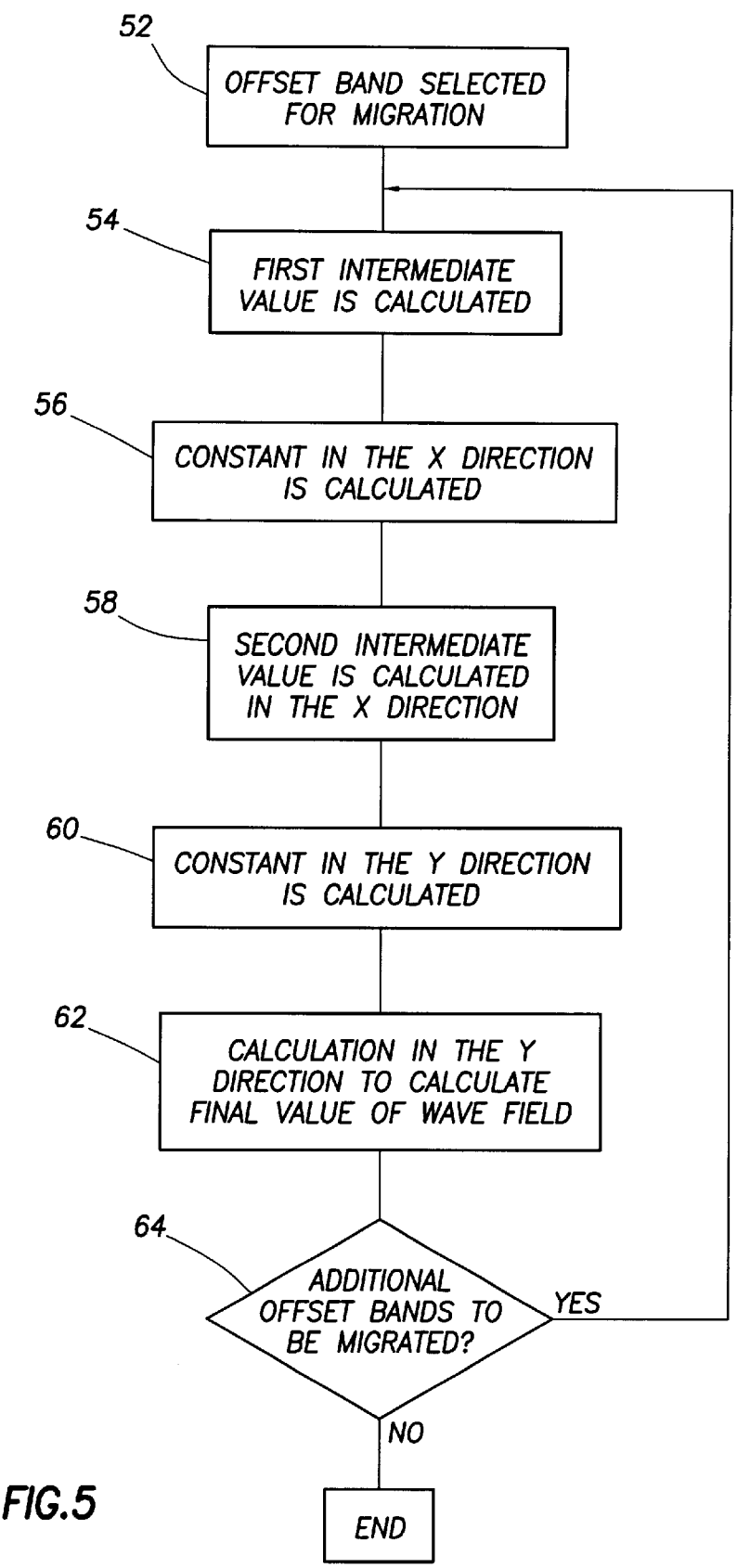
FIG. 5 is a flow diagram of the downward continuation process of the present invention.

A flow diagram of a data migration of an offset band according to the downward continuation technique disclosed herein is shown in FIG. 5. At step 52 of offset band is selected for migration. At step 54, a first intermediate value is calculated. The first intermediate value is calculated on the basis of data representative of the up going wave field at zero depth or a previously calculated wave field. At step 56, a constant in the x direction is calculated. The constant is not dependent on the wave field and, once calculated, can be used across each offset band for the given depth level. At step 58, a calculation step is performed in the x direction to find a second intermediate value. The second intermediate value is dependent on the first intermediate value and the constant in the x direction. At step 60 a constant in the y direction is calculated. Like the x direction constant, the y direction constant is not dependent on the value of the wave field and can be used across each offset band for the given depth level. At step 62, a calculation step is performed in the y direction to calculate the final value of the wave field at the next depth level on the basis of the second intermediate value and the constant in the y direction. At step 64, it is determined whether the next following depth level should be calculated. If so, processing continues at step 54 and the preceding wave field for the purposes of calculating the next following wave field is the wave field that was just calculated in the immediately preceding series of steps. In this manner, the calculation of the next following wave field is dependent on the preceding wave field, whether that wave field is considered to be the wave field at zero depth or some other calculated wave field at a lower depth level in the z direction.

It should be noted that once an offset band has been migrated, an image condition may be applied to the migrated offset band to produce an image for the offset band. It is contemplated that each offset band will have on the order of approximately 200 traces. Applying an image condition to each offset band permits the generation of migrated gathers in a manner that is efficient and reduces with a reduction of computational resources as compared to known techniques for generating migrated image gathers.

By taking advantage of certain computational efficiencies, the present invention permits the use of the wave equation for the generation of pre-stack depth migration gathers in the CDP-offset domain. The grouping of traces for migration into offset bins and the use of certain computation efficiencies during the downward continuation of the up going wave achieves savings in both time and computation resources, while permitting the use of the wave equation in the generation of image gathers.

Although the present disclosure has been described in detail, it should be understood that various changes, substitutions, and alterations can be made hereto without departing from the spirit and the scope of the invention as defined by the appended claims.

What is claimed is:

1. A method for migrating seismic traces generated by a shot, comprising the steps of:
grouping the seismic traces into a number of offset bands;
migrating the data represented by the seismic traces of each offset band; and
assigning an offset to the migrated data of each offset band.

2. The method for migrating seismic traces of claim 1, wherein the step of grouping the seismic traces comprises the step of grouping the seismic traces into no fewer than ten offset bands.

3. The method for migrating seismic traces of claim 1, further comprising the step of applying an image condition to the migrated data of each offset band to produce an image.

4. The method for migrating seismic traces of claim 1, wherein the step of migrating the data comprises the step of performing a downward continuation on the data of each offset band.

5. The method for migrating seismic traces of claim 4, wherein the step of performing a downward continuation comprises solving an approximation of the full wave equation.

6. The method for migrating seismic traces of claim 5, wherein the step of performing a downward continuation comprises solving for a constant that can be used for the downward continuation across multiple offset bands at the same depth level.

7. The method for migrating seismic traces of claim 5, wherein the step of performing a downward continuation comprises the step of performing a error correction following a predetermined number of downward continuation steps.

8. The method for migrating seismic traces of claim 5, wherein the step of performing a downward continuation comprises the steps of:
solving for a constant that can be used for the downward continuation across multiple offset bands at the same depth level; and
performing an error correction following a predetermined number of downward continuation steps.

9. A method for performing a downward continuation function on a grouping of traces selected according to the offset of the traces, comprising the steps of:
collecting data representative of an up going wave field in the z direction at zero depth;
calculating a first intermediate value on the basis of data representative of the up going wave field at zero depth;
calculating a constant in the x direction, the value of the constant being independent of the value of the wave field;
calculating in the x direction a second intermediate value, the value being dependent on the first intermediate value and the constant in the x direction;
calculating a constant in the y direction, the value of the constant being independent of the value of the wave field;
calculating in the y direction the final value of the wave field at the next depth level based on the second intermediate value and the constant in the y direction;
repeating the above calculation steps to calculate the wave field at each successive depth level.

10. The method of claim 9, further comprising the step of performing an error correction function following the calculation of the wave field.

11. The method of claim 9, wherein the error correction function is performed following a predetermined number of downward continuation steps.

12. A method for migrating seismic traces, comprising the steps of:
recording a series of seismic traces at a number of receivers;
grouping the seismic traces into a number of offset bands;
migrating the data represented by the seismic traces of each offset band according to a wave equation based downward continuation method;
assigning an offset to the migrated data of each offset band that is equal to the midpoint of each offset band; and
applying an image condition to the migrated data.

13. The method for migrating seismic traces of claim 12, wherein the downward continuation method performed on each offset band comprises the following steps:
calculating a first intermediate value on the basis of data representative of the up going wave field at zero depth;
calculating a constant in the x direction, the value of the constant being independent of the value of the wave field;
calculating in the x direction a second intermediate value, the value being dependent on the first intermediate value and the constant in the x direction;
calculating a constant in the y direction, the value of the constant being independent of the value of the wave field;
calculating in the y direction the final value of the wave field at the next depth level based on the second intermediate value and the constant in the y direction;
repeating the above calculation steps to calculate the wave field at each successive depth level.

14. The method for migrating seismic traces of claim 13, wherein the constant in the x direction and the constant in the y direction may be used for the downward continuation for each offset band for a defined depth level.

15. The method for migrating seismic traces of claim 14, further comprising the step of performing an error correction function on a calculated wave field following a predetermined number of downward continuation steps.

16. The method for migrating seismic traces of claim 12, wherein the number of offset bands is selected to provide for sufficient resolution in the resulting image gathers.

17. A method for migrating seismic traces recorded at a series of receivers, comprising the steps of:
grouping the traces into a series of offset bands;
migrating each offset band separately;
wherein the migration for each offset band is accomplished according to a downward continuation in which the value of each following wave field in an x and y grid is determined on the basis of the value of the wave field in the preceding x and y grid and a constant that is not dependent on the value of the wave field; and
wherein the constant is used for the downward continuation of all bands, thereby reducing the computational time and resources required for migration.

18. The method for migrating seismic traces of claim 17, further comprising the step of performing an error correction function on the calculated wave field following a number of downward continuation steps.

19. The method for migrating seismic traces of claim 17, further comprising the step of performing an image condition on the migrated offset bands.

* * * * *